(12) United States Patent
Bian et al.

(10) Patent No.: US 6,254,183 B1
(45) Date of Patent: Jul. 3, 2001

(54) REMOVABLE CUSHION FOR ISOFIX CHILD SEAT

(75) Inventors: Stephen Ce Bian, Novi; Lucian Bela, Troy, both of MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/606,295

(22) Filed: Jun. 29, 2000

(51) Int. Cl.[7] ............................................. A47C 1/08
(52) U.S. Cl. ..................... 297/250.1; 297/253; 297/232; 297/219.12
(58) Field of Search ....................... 297/250.1, 219.12, 297/253, 234, 236, 219.1, DIG. 6, 481, 452.27, DIG. 1, 232

(56) References Cited

U.S. PATENT DOCUMENTS

| 2,803,289 | 8/1957 | Phelps . | |
|---|---|---|---|
| 3,331,630 | * 7/1967 | Harsh | .................................. 297/253 |
| 4,756,573 | 7/1988 | Simin et al. . | |
| 5,121,964 | 6/1992 | Fourrey et al. . | |
| 5,409,293 | 4/1995 | Nagasaka . | |
| 5,551,750 | * 9/1996 | Ogawa et al. | .............. 297/452.27 X |
| 5,850,645 | * 12/1998 | Ogawa et al. | .............. 297/452.27 X |
| 5,890,761 | * 4/1999 | Miller | .................................. 297/232 |
| 5,918,934 | * 7/1999 | Siegrist | ............................. 297/253 X |
| 5,941,601 | 8/1999 | Scott et al. . | |

FOREIGN PATENT DOCUMENTS

962787 * 2/1975 (CA) ............................... 297/219.12

* cited by examiner

*Primary Examiner*—Laurie K. Cranmer
(74) *Attorney, Agent, or Firm*—Larry I. Shelton

(57) ABSTRACT

The present invention relates to a motor vehicle passenger seat assembly for use in a vehicle. The seat assembly comprises a seat bottom. The seat bottom comprises a base and a foam seat cushion. The seat cushion is removably attached to the base. The seat assembly further comprises a seat back in contacting relationship with the seat cushion of the seat bottom when the cushion is attached to the base. The seat assembly further comprises a pair of laterally spaced anchorage members for anchoring a child seat to the passenger seat. The anchorage members are located between the cushion and the base of the seat bottom.

19 Claims, 2 Drawing Sheets

REMOVABLE CUSHION FOR ISOFIX CHILD SEAT

TECHNICAL FIELD

The present invention relates to motor vehicle passenger seats provided with a child seat anchoring mechanism and, more specifically, to a device for use in anchoring a child seat to such passenger seats.

BACKGROUND ART

ISOFIX vehicle child seats are secured in a vehicle passenger seat by a pair of clips or latches on the child seat that are releasably mounted to rigid anchorage members in the vehicle. The anchorage members typically have portions which are located in the passenger seat at the intersection of the seat bottom and the seat back. The linkages between the clips or latches on the child seat and the anchorage members on the passenger seat are sufficiently rigid to secure a child seat to the passenger seat without the need for any other securing mechanism such as passenger seat belts.

Problematically, because the anchorage members are disposed between the cushions of the seat back and the seat bottom, they may be difficult to locate and/or access. Obviously, this creates difficulty in securing the child seat to the anchorage members. This can also obviously make it difficult to determine if the child seat is properly secured since the linkages are hidden between the cushions. Moreover, the rigid anchorage members, being disposed at the intersection of the passenger seat bottom and back, makes folding of the seat difficult, because the anchorage members tend to inhibit the seat back from being fully lowered. The anchorage members may also provide discomfort for a passenger sitting in the seat when the child's seat is not mounted on the seat. Furthermore, the clips on the child seat may cause damage to the fabric of the seat back or to an adjacent socket for a seat belt buckle if accidently pushed into the socket.

What is desired then are a pair of anchorage members for anchoring a child safety seat that do not interfere with the seat back folding, that do not negatively impact passenger comfort, that do not damage the seat back material or an adjacent socket for a seat belt buckle if it inadvertently pushed into the socket, that facilitate easy and convenient securing of the child seat to the passenger seat, and that enables a person to readily observe whether the child seat is safely/properly secured on the passenger seat.

DISCLOSURE OF INVENTION

The present invention overcomes the disadvantages of the related art by providing a motor vehicle passenger seat assembly for use in a vehicle comprising a seat bottom comprising a base and a foam seat cushion. The seat cushion is removably attached to the base. The seat assembly further comprises a seat back in contacting relationship with the seat cushion of the seat bottom when the cushion is attached to the base. The seat assembly further comprises a pair of laterally spaced anchorage members for anchoring a child seat to the passenger seat. The anchorage members are located between the cushion and the base of the seat bottom.

In a preferred embodiment, the passenger seat assembly base has a first rigidity and the cushion has a second rigidity less than the first rigidity.

BEST MODE FOR CARRYING OUT THE INVENTION

Figure 1:
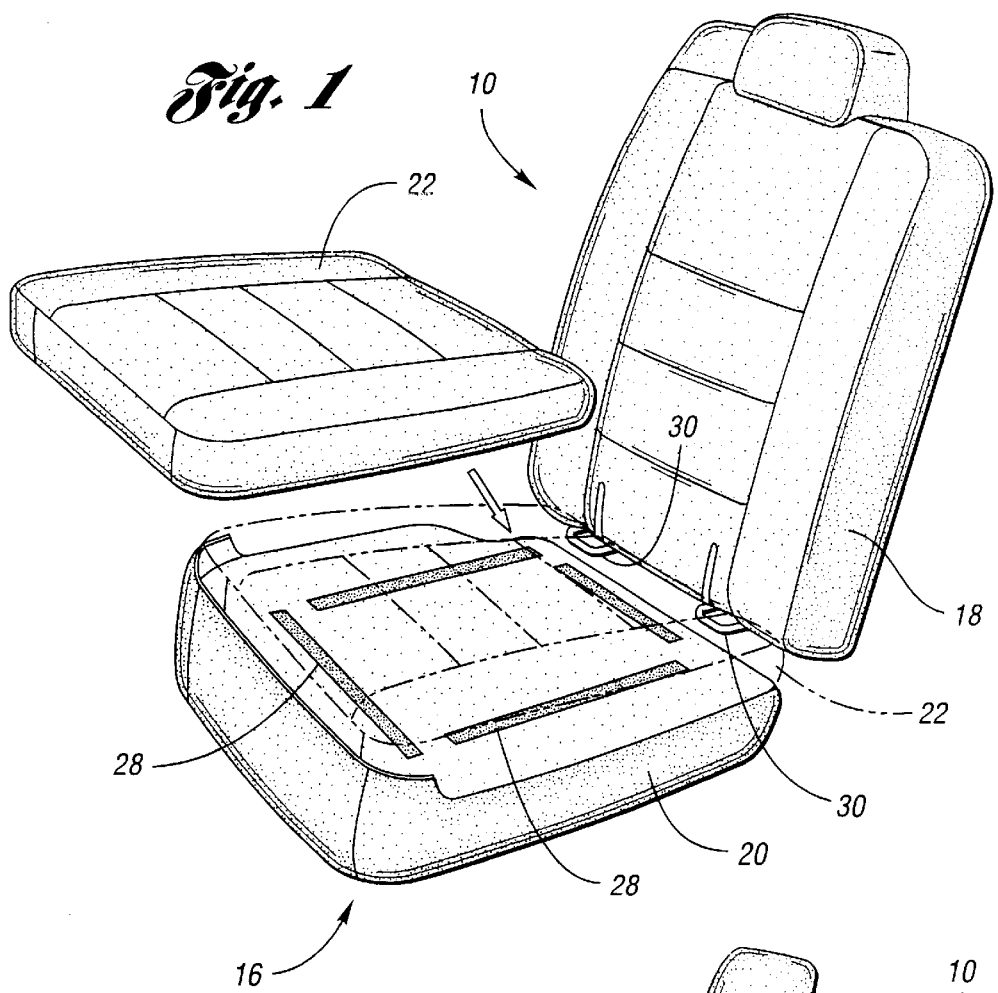
FIG. 1 is a perspective view of a vehicle passenger seat in accordance with the present invention.

As shown in the Figures, a vehicle passenger seat 10 is provided for securing a ISOFIX child seat 12 (FIG. 2) to a vehicle. Referring to FIG. 1, the passenger seat 10 is shown in detail. The passenger seat 10 comprises a seat bottom 16 and a seat back 18. The seat bottom 16 comprises a seat base 20 and a seat cushion 22. The seat cushion 22 is removably attached to, or detachable from, the seat base 20 by any suitable means. As shown in FIG. 1, the seat base 20 is provided with a plurality of velcro strips 28 and the seat cushion 22 has corresponding velcro strips (not shown) on its underside which cooperate with the velcro strips 28 to releasably secure the seat cushion 22 to the seat base 20. The seat cushion 22 can be removed from the seat base 20 by lifting the seat cushion away from the seat base to separate the velcro strips 28 on the seat cushion from the velcro strips on the seat base. Means other than velcro strips can be employed to releasably secure the seat cushion 22 to the seat base 20. Suitable means include, but are not limited to, snaps, latches, and zippers.

Figure 2:
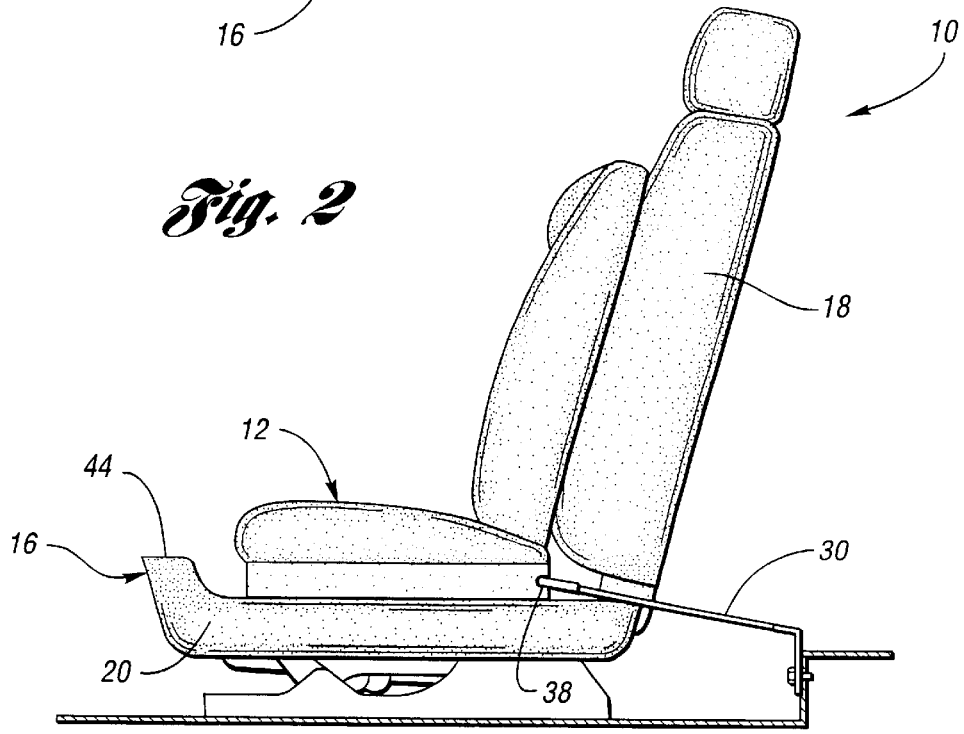
FIG. 2 is a side view of the vehicle passenger/seat shown in FIG. 1 with a child seat mounted on it in accordance with the present invention.
Figure 3:
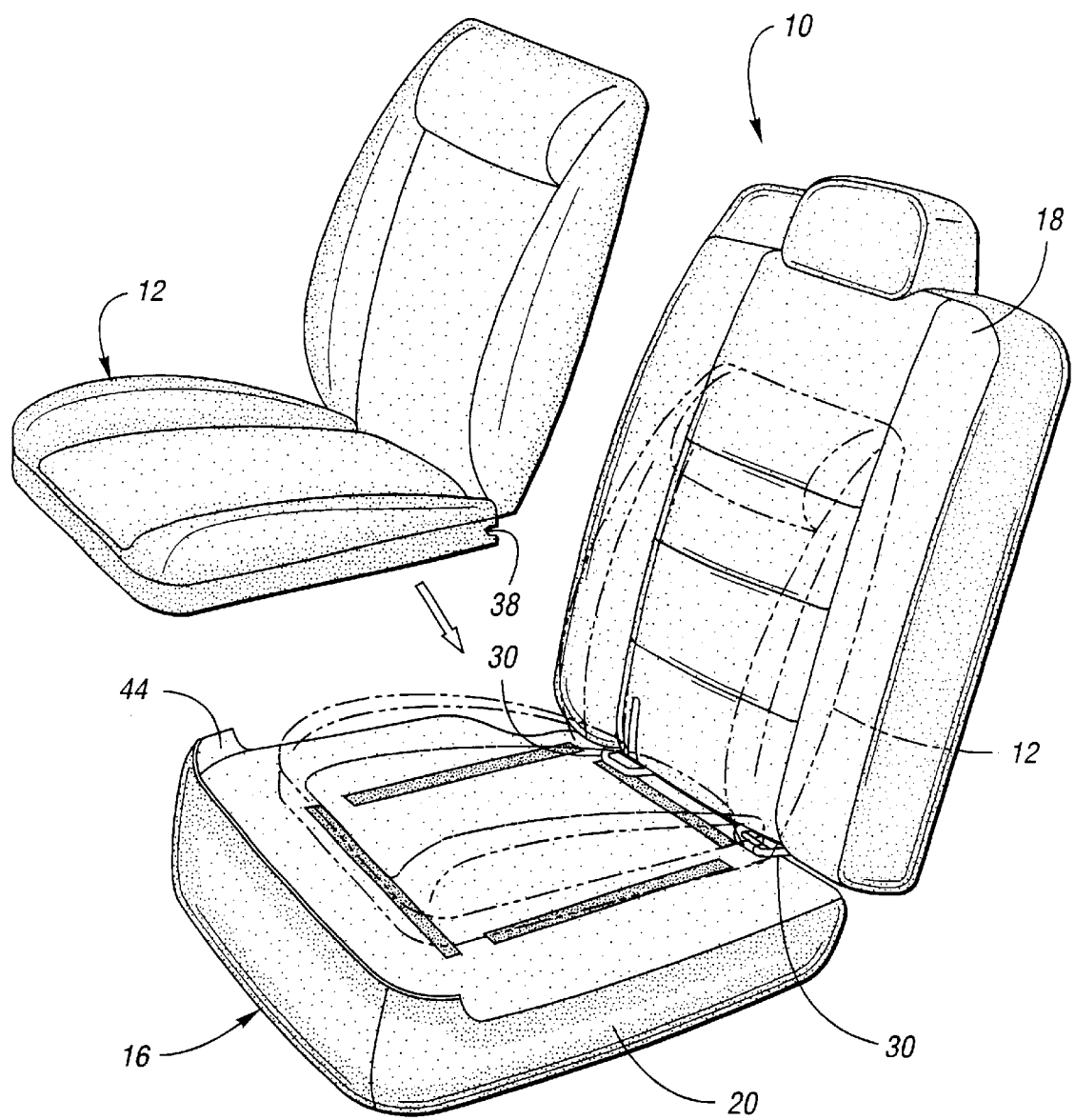
FIG. 3 is a perspective view of the vehicle passenger seat and the child seat shown in FIG. 2.

A pair of anchorage members, or ISOFIX strikers, 30, are provided for securing the child seat 12 to the vehicle. The anchorage members 30 are laterally spaced with respect to each other, each has a first end secured to the body structure of the vehicle, as shown in FIG. 2, and a second end extending between the seat back 18 and the seat base 20 of the seat bottom 16. The second end of the anchorage members 30 has a latch receiving portion. It should be readily understood that the first end of the anchorage members 30, instead of being secured to the body structure of the vehicle, could be secured to any other suitable structural member, such as the frame (not shown) of the seat back 18, the frame (not shown) of the seat cushion 22, or the frame (not shown) of the seat bottom support structure (not shown).

The anchorage member 30 must be formed of such a material and have such a structure and/or strength to be able to securely fasten the child seat 12 to the vehicle structure to inhibit an unacceptable amount of movement of the child seat. Preferably, the anchorage members 30 are formed from a 6 mm diameter steel rod which are bent so as to form essentially elongated U-shaped members. The first end of the anchorage members 30 form the opened portion of the essentially elongated U-shaped members while the second end forms the closed, or base, portion of the essentially elongated U-shaped members. It should be readily understood that the anchorage members 30 could also have a shape that is not a U-shaped, such as a rectangular or oval shape.

The child seat 12 is provided with a pair of jaws, or latches 38 for securing the child seat to the anchorage members 30. The jaws 38 of the child seat 12 are provided with known latch and/or clip mechanisms (not shown) for securing the child seat 12 to the anchorage members 30. The jaws 38 are laterally spaced from each other essentially the same distance as are the anchorage members 30.

To secure the child seat 12 to the anchorage members 30, the child seat is pushed back into the anchorage members until each of the latch or clip mechanisms engages with the latch receiving portion of the corresponding anchorage members 30. The jaws 38 include a release mechanism (not shown) for releasing the jaws from the anchorage members to enable the child seat 12 to be removed from the vehicle passenger seat 10.

As shown in the Figures, the second end of the anchorage members 30 are disposed between the seat cushion 22 and the seat base 20 of seat bottom 16 of the passenger seat 10. Being so disposed, the second end of the anchorage members 30 are hidden (i.e., not visible), or partially hidden, from view when the seat cushion 22 is secured to the seat base 20. When the seat cushion 22 is attached to the seat base 20, seat 10 is essentially the same as a typical passenger seat wherein a regular vehicle occupant can sit or a non-ISOFIX child seat can be conventionally fastened. Thus, the seat cushion 22 must be removed or detached from the seat base 20 before the ISOFIX child seat 12 can be secured to the anchorage members 30. Once the seat cushion 22 is removed, the anchorage members 30 are readily visible. This enables the child seat 12 to be easily secured to the anchorage members 30. The seat bottom 20 preferably has an upwardly extending retaining wall 44 or lip to help retain the seat cushion 22 on the seat base 20.

As discussed above, the seat bottom 16 comprises the seat base 20 and the seat cushion 22. Preferably, the seat cushion 22 is preferably made of conventional seat foam and trim to provide a comfortable and aesthetically pleasing seating surface for the vehicle occupant. Suitable foam materials include polyurethane foam. Preferably, the foam material of the seat cushion has a first density that is between about 15 $kg/m^3$ to about 85 $kg/m^3$, more preferably between about 35 $kg/m^3$ to about 70 $kg/m^3$, and most preferably about 40 $kg/m^3$ to about 60 $kg/m^3$.

The seat base 20 could be made of the same type of material as the seat cushion 22, but preferably is made of a material that is more rigid than that of the seat cushion 22. Preferably, the seat base 20 is made of a foam material that is more rigid, or has a higher foam density, than that of the foam material of the seat cushion 22. Preferably, the seat cushion 22 is made of a polyurethane foam and has a density that is higher than the density of the foam material of seat base 20 and is preferably, depending on the density of the foam material of the seat cushion, between about 25 $kg/m^3$ to about 105 $kg/m^3$, more preferably between about 40 $kg/m^3$ to about 90 $kg/m^3$, and most preferably about 60 $kg/m^3$ to about 85 $kg/m^3$. In addition to a higher density foam, the seat base 20 could be made of a hard injection, or blow-molded thermoplastic material, such as polypropylene and ABS; metal such as steel or aluminum, or other rigid structural materials such as wood.

In an alternative embodiment, the seat base 20 could comprise a composite structure comprising a bottom portion made of a conventional cushion material or relatively non-rigid material, such as polyurethane foam, and a rigid panel made of hard plastic, metal, or some other suitable rigid material, on top of the bottom portion.

Preferably, the seat cushion 22 and the seat base 20 are made of such a material and have such a thickness that their indention loads (@ 50% IFD 101.6 mm) are between about 100 N (Newtons) and about 400 N and, 450 N and about 4,000 N, respectively. More preferably, the seat cushion 22 and the seat base 20 are made of such a material and have such a thickness that their indention loads are between about 150 N and about 250 N and, 500 N and about 1,000 N, respectively. Most preferably, the seat cushion 22 and the seat base 20 are made of such a material and have such a thickness that their indention loads are between about 200 N and about 300 N and, 600 N and about 900 N, respectively.

Preferably, the seat cushion 22 and the seat base 20 are made of such a material and have such a thickness that the indention load of the seat button 16 is between about 200 N and about 2,000 N. More preferably, the seat cushion 22 and the seat base 20 are made of such a material and have such a thickness that the indention load of the seat cushion 16 is between about 500 N and about 1,500 N. Most preferably, the seat cushion 22 and the seat base 20 are made of such a material and have such a thickness that the indention load of the seat cushion 16 is between about 750 N and about 1,000 N.

The thicknesses of the seat cushion 22 and the seat base 20 may vary and depends upon a number of factors, such as the overall thickness of the seat bottom 16, and the types of material which the cushion 22 and the base 20 are made of. Preferably, the thickness of the seat cushion 22 is between about 1–6", more preferably between about 2–4", and most preferably between about 2–3". Preferably, the thickness of the seat base is between about 1–6", more preferably between about 6–3" and more preferably between about 6–5".

In a preferred embodiment, the rigidity of the seat base 20 is such that when a child seat, such as child seat 12, is secured to the anchorage members 30 and standard test FMVSS 225 is performed, displacement at X-point, as described in FMVSS 225, of the child seat in the x-, or forward-direction, is between 0–5", more preferably between 0–4", and most preferably between 0–3".

While the best mode for carrying out the invention has been described in detail, those familiar with the art to which this invention relates will recognize various alternative designs and embodiments for practicing the invention as defined by the following claims.

What is claimed is:

1. A motor vehicle passenger seat assembly for use in a vehicle comprising:
   a seat bottom, the seat bottom comprising a base and a foam seat cushion, the seat cushion being removably attached to the base;
   a seat back in contacting relationship with the seat cushion of the seat bottom when the seat cushion is attached to the base; and
   a pair of laterally spaced anchorage members for anchoring a child seat to the seat bottom when the seat cushion is detached from the base, the anchorage members being located between the seat cushion and the base of the seat bottom and having a first end attached to a rigid portion of the vehicle and a second end extending between the seat back and the seat base for attachment to the child seat.

2. The motor vehicle passenger seat assembly of claim 1 wherein the anchorage members have portions that are at least partially hidden from view under the seat cushion when the seat cushion is attached to the base.

3. The motor vehicle passenger seat assembly of claim 2 wherein the portions of the anchorage members that are at least partially hidden when the seat cushion is attached to the base are exposed when the seat cushion is detached from the base.

4. The motor vehicle passenger seat assembly of claim 1 wherein the base has a first rigidity such that X-point displacement is less than about 5 inches in the x-axis when the base undergoes FMVSS 225 testing and the cushion has a second rigidity less than the first rigidity.

5. The motor vehicle passenger seat assembly of claim 4 wherein the base is between about 1–6 inches thick.

6. The motor vehicle passenger seat assembly of claim 5 wherein the seat cushion is between about 1–6 inches thick.

7. The motor vehicle passenger seat assembly of claim 1 wherein the base has a first rigidity such that X-point displacement is less than about 3 inches in the x-axis when the base undergoes FMVSS 225 testing and the cushion has a second rigidity less than the first rigidity.

8. The motor vehicle passenger seat assembly of claim 1 wherein the anchorage members are completely hidden from view under the seat cushion when the seat cushion is attached to the base.

9. A motor vehicle passenger seat assembly for use in a vehicle comprising:
   a seat bottom, the seat bottom comprising a base and a foam seat cushion, the seat cushion being removably attached to the base;
   a seat back in contacting relationship with the seat cushion of the seat bottom when the seat cushion is attached to the base;
   a child seat; and
   a pair of laterally spaced anchorage members located between the cushion and base of the seat bottom for anchoring the child seat to the base of the seat bottom when the seat cushion is removed from the base.

10. The motor vehicle passenger seat assembly of claim 9 wherein the base has a first rigidity and the cushion has a second rigidity less than the first rigidity.

11. The motor vehicle passenger seat assembly of claim 9 wherein the first rigidity is such that X-point displacement is less than about 5 inches in the X-axis when the base undergoes FMVSS 225 testing.

12. The motor vehicle passenger seat assembly of claim 11 wherein the base is between about 1–6 inches thick.

13. The motor vehicle passenger seat assembly of claim 12 wherein the seat cushion is between about 1–6 inches thick.

14. The motor vehicle passenger seat assembly of claim 13 wherein the base is made of first foam having a first density, and the foam seat cushion is made of a second foam having a second density, less than the first density.

15. The motor vehicle passenger seat assembly of claim 9 wherein the seat cushion and the base each have members for attaching the seat cushion to the base.

16. The motor vehicle passenger seat assembly of claim 9 wherein the anchorage members are shaped as essentially elongated U-shaped members, the anchorage members having a first end forming an opened portion of the essentially elongated U-shaped members and attaching to a rigid portion of the vehicle and a second end forming a closed portion of the essentially elongated U-shaped member and extending between the seat back and the seat base for attachment to the child seat.

17. The motor vehicle passenger seat assembly of claim 9 wherein the child seat is an ISOFIX child seat.

18. A motor vehicle passenger seat assembly for use in a vehicle comprising:
   a seat bottom, the seat bottom comprising a base and a foam seat cushion, the seat cushion being removably attached to the base;
   a seat back in contacting relationship with the seat cushion of the seat bottom when the seat cushion is attached to the base;
   a child seat having latch members; and
   a pair of laterally spaced anchorage members for anchoring the child seat to the seat bottom when the seat cushion is detached from the base, the anchorage members being located between the cushion and the base of the seat bottom, a first end of the anchorage members being hidden from view when the seat cushion is attached to the base and being exposed when the seat cushion is removed from the base; and
   the child seat latch members being removably attached to the first end of the anchorage members when the seat cushion is removed from the base.

19. The motor vehicle passenger seat assembly of claim 18 wherein the seat bottom has the appearance of a typical adult passenger seat bottom when the seat cushion is attached to the base.

* * * * *